Patented May 4, 1926.

1,583,179

UNITED STATES PATENT OFFICE.

HAROLD ANTHONY RICHMOND, OF PORTER, AND ROBERT MACDONALD, JR., OF NIAGARA FALLS, NEW YORK, ASSIGNORS TO GENERAL ABRASIVE COMPANY, INC., OF NIAGARA FALLS, NEW YORK, A CORPORATION OF NEW YORK.

ARTIFICIAL ALUMINOUS ABRASIVE AND PROCESS OF MAKING SAME.

No Drawing. Application filed August 9, 1924. Serial No. 731,043.

*To all whom it may concern:*

Be it known that we, HAROLD ANTHONY RICHMOND, a citizen of the United States, residing at Porter, in the county of Niagara and State of New York, and ROBERT MACDONALD, Jr., a citizen of the United States, residing at Niagara Falls, in the county of Niagara and State of New York, have jointly invented a new and useful Improvement in Artificial Aluminous Abrasives and Processes of Making Same, of which the following is a specification.

Our invention relates to artificial aluminous abrasives made in the electric furnace, and more particularly to those substantially free from titanium.

In our U. S. Patent 1,413,785, we describe a method of making artificial aluminous abrasives from natural corundum or other impure form of aluminum oxide containing a very small amount of titanium, and thereby obtaining a product containing less than .6 of one per cent of titanium.

In this process a very large amount of energy in the form of heat is required. This is due mainly to the high melting temperature of alumina which is approximately 2100° C. Practically the only way this temperature can be obtained commercially is my means of the electric arc. About 2600 kilowatt hours are required in practice to produce one ton of purified crystalline alumina. The cost of energy is therefore a very large item in the cost of production. It will ordinarily amount to 25% of the total factory cost of converting natural corundum into artificial crystalline alumnia, even where electric energy can be obtained at exceptionally low rates.

Our invention provides a method for reducing the amount of energy in the form of heat needed to melt alumina, by reducing the temperature at which the process is carried out. It also provides other advantages which will be referred to later. We have found that by adding certain compounds, as for example an alkaline earth, the temperature at which fusion of the charge occurs is materially lowered, and the viscosity of the melted mass is decreased, so that a considerable part of the electric energy is saved. It follows that the same amount of electric energy will produce more abrasive and the cost of current per pound of abrasive is reduced proportionately.

For example we have added 8% by weight of calcium carbonate to a charge composed of natural corundum, steel turnings, and of natural corundum, steel turnings, and coke, and increased by 10% the amount of crystalline alumina produced. Other alkaline earths have the same effect, but in varying degrees.

In carrying out our process we use natural corundum or other aluminous materials containing but little titanium. These materials may be previously treated for the removal of moisture free or combined. If desired they may be chemically treated for the partial or complete removal of impurities. If the aluminous material has not been previously purified, enough coke, preferably in pulverized form, is added to reduce in the furnace most of the natural impurities, in the aluminous material. The resulting metals unite to form a metallic alloy, which segregates principally at the bottom of the furnace. In this case sufficient iron may be added, preferably in the form of steel turnings, to make the alloy magnetic and thereby facilitate its subsequent removal by means of magnets. Whether or not carbon and iron in some form are used, we add to the natural corundum or aluminous material, calcium carbonate, or an equivalent. Various proportions of calcium carbonate and aluminous material may be used. We have obtained good results using 8 parts by weight of calcium carbonate to 100 parts natural corundum, but we do not limit ourselves to this proportion. If less than 2 parts calcium carbonate are used the effect on the temperature of operation is small.

All of the ingredients of the mixture should be in small pieces, preferably less than one inch across. After being mixed together they are melted in an electric furnace of any convenient type. Upon cooling, the metallic alloy, if any, is separated from the crystallized alumina by hand picking, by magnets, or by any other practicable means.

In the process of fusion the carbonate is calcined to the oxide, which is as hard to reduce as alumina and therefore remains unreduced in the product. Where titanium oxide is present in appreciable quantities it has been reported that the alkaline earth unites with it to form an inter-crystal glass surrounding the crystals of alumina, thereby holding the latter together with considerable tenacity. But in the absence of titanium oxide we have found that the alkaline earth unites with the alumina to form a double oxide of aluminum and alkaline earth. Since the other impurities in the natural corundum are mostly reduced to the metallic form and segregated, the amount of inter-crystal glass formed by our process is exceedingly small, usually about 1%, and never over 2%. Petrographic studies show that artificial aluminous abrasives are composed of crystals of alumina (either pure or impure) held together by an intercrystal glass composed of metallic oxides. In our improved abrasive the relative quantity of this glass is exceedingly small and because the amount of titanium it contains is negligible what glass there is is very brittle or friable in character. It follows that the crystals of our abrasive are weakly held together, so that the grains are readily fractured. The practical result of this is to allow individual crystals composing the grain to be dislodged when they become dull in service, thereby presenting new cutting points to the work. This produces a very free cutting action of the grains. In certain kinds of grinding and polishing operations, particularly those operations where the arc of contact between the wheel and the work is relatively long, this free cutting action greatly increases the efficiency of the wheel. This action is helped by the small size and consequent large number of crystals. Some of the grains show partial boundaries, others are anhedral. Most of the grains showing partial boundaries are nearly equal sided rhombs, a few show strong development of the basal plane. The predominating smooth planes of contact between the crystals are in marked contrast to the formation of other impure aluminous abrasives. In these the irregular surfaces of the crystals form an interlocking arrangement which holds them to each other and thereby imparts a quality of toughness to the abrasive. Our abrasive, partly due to the smoothness of the crystals above described, is characterized by a high degree of friability compared with other impure aluminous abrasives.

To further describe our process and its advantages we cite the following: For comparison we first fused a mixture without an alkaline earth. We took natural corundum containing 91.5% alumina, 4% silica, 2.3% iron oxide and 0.1% titanium oxide and added to it iron borings and coke in these proportions: Corundum 90%, borings 7.2%, coke 2.8%. When this mixture was melted the coke reduced to their elemental form the greater part of the oxides of silicon and iron, as well as a small part of titanium oxide, as in the reaction $SiO_2 + 2C \rightarrow Si + 2CO$. The reduced metals, together with the added iron, united to form a metal alloy.

The theoretical amount of energy necessary to fuse and convert 100 lbs. of the above mixture into abrasive containing about 98.5% alumina, with the excess impurities reduced to a metal alloy is made up of several factors as follows:

| | Calb. |
|---|---|
| Heating mixture up to necessary operating temperature | 92,130 |
| Latent heat of fusion of the several ingredients | 4,560 |
| Heat required to reduce impurities | 5,600 |
| Total | 102,290 |

From these figures it appears that 90% of the effective heat was used in bringing the mixture up to the necessary temperature.

If to the above specified mixture of corundum borings and coke, 6% strontium carbonate is added, we have found that the furnace may be operated at a temperature about 150° C. lower than when no strontium carbonate or its equivalent is used. Since in the latter case the furnace must be operated at a temperature of about 2000° C. a direct saving is made of approximately 7% of the major item in the heat energy used.

But this is not the only saving in heat energy. In all electric furnaces the heat lost by conduction, convection and radiation is a considerable item, sometimes amounting to 50% of the total heat supplied to the furnace. As conduction and convection losses are proportional to the furnace temperature and radiation losses are proportional to the fourth power of the absolute temperature, the lowering of the operating temperature as above described effects an important savings in the heat losses. In the case where 6% strontium carbonate was added, the total saving, including heat losses, due to the lowering of the operating temperature, was 9% of the total energy required when strontium carbonate was not used.

As a corollary we found that the same number of heat units needed to produce 9,400 pounds of abrasive without the addition of strontium carbonate or other fluxing impurity, produced 10,280 pounds when 6% strontium carbonate was added to the charge.

The product resulting when the above charge was used with the addition of 6% strontium carbonate, analyzed as follows:

| | Per cent. |
|---|---|
| $Al_2O_3$ | 93.6 |
| SrO | 4.56 |
| $SiO_2$ | .88 |
| $Fe_2O_3$ | .81 |
| $TiO_2$ | .15 |

We do not limit ourselves to the proportions of ingredients in the charge above named and the product may vary considerably from the above analysis within the scope of our invention. It is essential that the percentage of titanium oxide in the aluminous material used shall be low, preferably not more than 1% and that a sufficient quantity of an alkaline earth or its equivalent shall be used to effect a positive fluxing action on the charge. In general this quantity should exceed 2%. If the aluminous material used contains considerable quantities of silica and iron oxide, the excess should be reduced so that less than 2% of each remain in the product. A part of the titanium oxide may be reduced. The percentage of titanium remaining in the product should not exced .5%.

Other advantages of our process are:

1st. Improved operation of the furnace characterized by smoother reduction and absence of boiling. Boiling is believed to be augmented by volatilization of one or more of the reduced impurities. By operating at a lower temperature this effect is minimized. In consequence of these improved operating conditions furnace attendance is lessened and danger of injury to the furnace attendants from spattering is minimized.

2nd. Less destructive action of the molten charge on the walls of the furnace by reason of its lower temperature. Formerly the intense heat of the molten contents of the furnace would sometimes cause these to melt their way through the refractory furnace walls. With our process this difficulty is overcome.

3rd. An improved quality of product. We have found that the crystalline alumina produced by our method is more uniform in character and possesses better abrasive qualities than that produced otherwise. We have observed that the furnace charge becomes more fluid when alkaline earth or its equivalent is used and this provides a better condition for more perfect crystallization than is possible where the contents of the furnace are more or less viscous in certain localities, as for example, is likely to be the case near the furnace walls. When the supply of heat is stopped more time elapses before crystallization is complete. In accordance with a well known metallurgical principle more perfect individual crystals are thereby formed.

4th. The higher degree of fluidity of the furnace contents permits readier and more complete segregation of the reduced impurities. These are heavier than the molten alumina, but not enough so to sink to the bottom of the mass unless this is highly fluid.

We claim:

1. In the production of crystalline alumina from an aluminous ore the improvement which consists in lowering the operating temperature by the addition of an alkaline earth to the furnace charge.

2. In the production of artificial corundum from natural corundum the improvement which consists in lowering the operating temperature by the addition of an alkaline earth to the furnace charge.

3. The herein described process of reducing the amount of heat required to produce artificial corundum from natural corundum which consists in adding calcium carbonate to the furnace charge.

4. The herein described process of reducing the amount of energy required to produce artificial corundum from an aluminous material, which consists in adding an alkaline earth to the furnace charge.

5. The herein described process of reducing the amount of energy in the form of heat required to produce artificial corundum from an aluminous material low in titanium, which consists in adding an alkaline earth to the furnace charge.

6. The herein described process of reducing the amount of energy required to produce artificial corundum from a refined aluminous ore which consists in adding an alkaline earth to the furnace charge.

7. In the production of artificial corundum the herein described improvement in the segregation of the reduced impurities which consists in increasing the fluidity of the contents of the furnace by adding an alkaline earth to the furnace charge.

8. An aluminous abrasive containing a substantial amount of calcium oxide and substantially free from titanium.

9. An aluminous abrasive containing a substantial amount of an alkaline earth and substantially free from titanium.

10. An aluminous abrasive containing a substantial amount of alkaline earth and in which most of the alkaline earth exists in the form of a double oxide with the aluminum.

11. An aluminous abrasive containing a substantial amount of an alkaline earth and not more than 2% of intercrystal glass.

12. An aluminous abrasive containing a substantial amount of an alkaline earth, less than 2% each silica and iron oxide, and less than .5% titanium.

13. An aluminous abrasive containing a substantial amount of fluxing impurities, less than .5% titanium, and less than 2% intercrystal glass.

14. An aluminous abrasive containing more than 2% of an alkaline earth and substantially free from titanium and characterized by relatively weak adhesion between adjacent crystals.

15. An aluminous abrasive containing a substantial amount of calcium oxide and less than .5% titanium and the individual crystals of which have a high degree of perfection and uniformity of shape.

16. An abrasive consisting of impure crystalline alumina whose crystals have smooth faces of contact.

17. An impure alumious abrasive containing a substantial amount of an alkaline earth and less than .5% titanium and characterized by high friability compared with known impure aluminous abrasives.

HAROLD A. RICHMOND.
ROBERT MACDONALD, Jr.